April 11, 1950  G. B. SPEIR ET AL  2,503,457
PROPELLER BLADE DEICING SHOE
Filed April 4, 1947
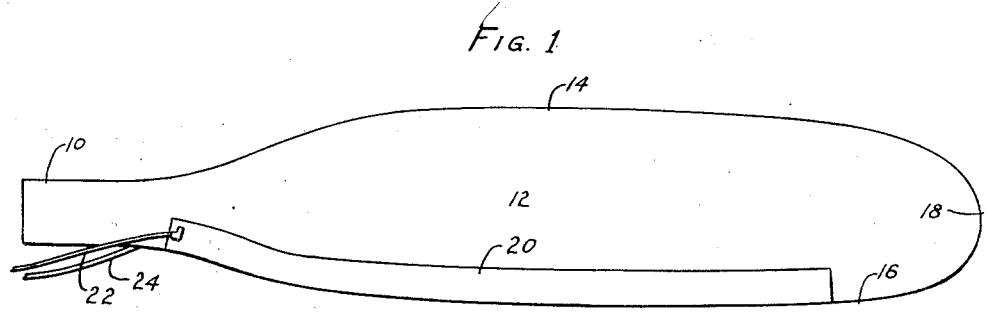
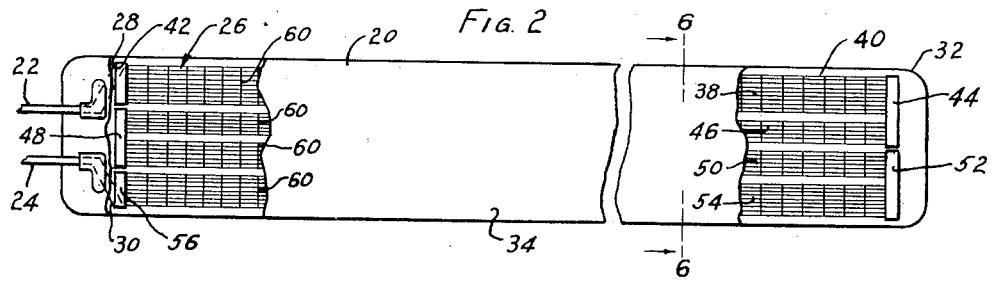
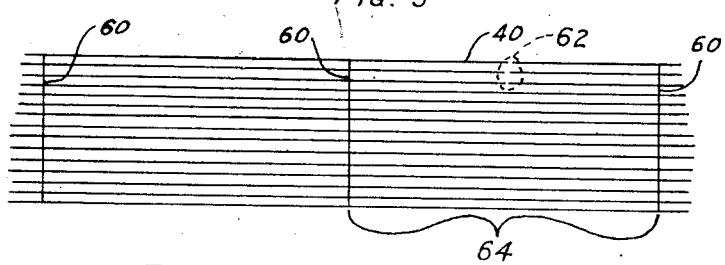
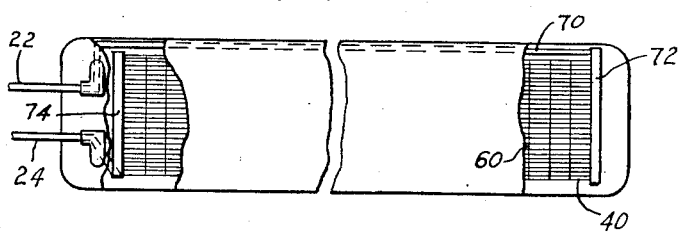
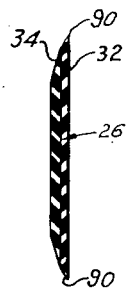
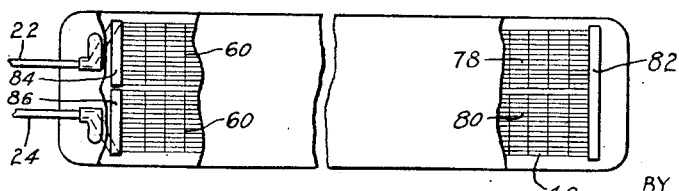
INVENTORS
DEL WEHRLE and
GODFREY B. SPEIR
BY Godfrey B. Speir
ATTORNEY Patented Apr. 11, 1950

2,503,457

UNITED STATES PATENT OFFICE 2,503,457

PROPELLER BLADE DEICING SHOE

Godfrey B. Speir, Cedar Grove, and Del Wehrle, Montclair, N. J., assignors to Curtiss-Wright Corporation, a corporation of Delaware Application April 4, 1947, Serial No. 739,294

1 Claim. (Cl. 219—19)

This invention relates to electrical resistance heaters and is concerned particularly with heater elements adapted for use in the de-icing of aircraft components such, for instance, as aircraft propeller blades.

The use of electrical resistance heaters for the de-icing of aircraft wings, propeller blades, and the like, is rather well established, such heaters having a variety of forms and being applied both inside and outside of the surface of the structure requiring de-icing heat. The present invention relates particularly to that type of resistance heater which is applied exteriorly of an aircraft surface and which comprises resistance elements contained within a flexible rubber sheet which may be applied by suitable bonding techniques to aircraft surfaces having various degrees of curvature. Externally applied flexible resistance heaters, are usually formed of natural, synthetic or artificial rubber, and the heater is so arranged that one which has failed or which has been abraded by impact of solid matter thereon during flight operation can be removed and a new one installed. The life of heaters of this type is usually limited by abrasion and frequently, while the heater shoe itself may be serviceable, it is rendered useless by the fact that solid matter has punctured the shoe in one or more places and has fractured or broken the actual resistance elements within the shoe, rendering the shoe useless as a heater.

It is an object of this invention to provide a resistance grid for an aircraft de-icing shoe which will have a much greater life expectancy than heater shoes previously employed. It is a further object of the invention to provide an electrical resistance network in a heater shoe which is so constructed to enable its continued electrical operation even though a substantial area of the shoe may have been torn or abraded. Another object of the invention is to provide an electrical heater construction which will remain effective even though a substantial proportion of the heater surface has been rendered inactive by failure of electrical components.

While certain specific embodiments of the invention have been chosen for illustration, it is to be understood that these are for illustrative purposes only and are not to be construed as limiting the scope of the invention, except as the scope is limited and defined in the appended claim.

In the drawings, in which similar reference characters indicate similar parts, Fig. 1 is a plan of an aircraft propeller blade embodying the heater shoe of the invention;

Fig. 2 is a plan, partly broken away, of a developed heater shoe prior to attachment to a propeller blade;

Fig. 3 is an enlarged fragmentary plan of a portion of the resistance wire grid forming part of the shoe;

Figs. 4 and 5 are plans of alternative forms of heater shoes, partly broken away to show the grid arrangement; and Fig. 6 is an enlarged section on the line 6—6 of Fig. 2.

Referring briefly to Fig. 1, a propeller blade is shown having a shank portion 10 normally secured within a propeller hub, the latter being omitted since it is familiar to those versed in the art. From the shank extends a blade portion 12 having a trailing edge 14 and a leading edge 16, the blade portion terminating at its outer end in a tip 18. Along and around the major portion of the blade leading edge 16 a heater shoe 20 is secured, the latter having a pair of electrical terminals 22 and 24 at its shank end leading to a suitable source of electrical power or energy. The shoe 20 as shown in Fig. 2, comprises an elongated blanket or sheet of rubber-like flexible material having a resistance grid 26 embedded therein, the terminals of the resistance grid connecting to the leads 22 and 24 through conductors 28 and 30. Flexibility is embodied in the shoe 20 so that it may be conformed smoothly to the surface and around the leading edge of the blade.

The shoe 20 preferably comprises an inner insulating layer 32 of rubber upon which the resistance grid 26 is disposed, the resistance grid then being covered by another rubber sheet 34, the two sheets 32 and 34 then being firmly bonded or cemented to one another to hold the resistance grid in place and to form a unit structure which may be rolled, twisted and handled both for shipping purposes and for final application upon propeller blades. If desired, the exposed inner surface of the sheet 32 may be prepared with a layer of protected bonding material thereon to enable its expeditious attachment to a propeller blade or to other apparatus.

One form of a resistance grid known in the art comprises a series of pluralities of resistance filaments, serially connected, such pluralities having different numbers of resistance filaments therein to allow of differential heating effects across the grid. For instance, referring to Fig. 2, an outer grid portion 38 may comprise a large plurality of filaments 40 connected in parallel at their one ends to a flexible end braid 42, and connected at their other ends to end braid 44 at the outer end of the shoe. From the braid 44, a second plurality 46 of resistance filaments 40 extend toward the inner end of the shoe to an end braid 48, the number of filaments in the plurality 46 being less than the number in the plurality 38. In similar fashion, a plurality 50 of filaments 40 extend from the braid 48 outwardly to a braid 52 and from the braid 52 still another plurality 54 of filaments 40 extends inwardly to a terminal braid 56. The braids 42 and 56 respectively are connected to the leads 22 and 24. Where the number of filaments in the plurality is large, the heating effect thereof will be relatively less than where the plurality of filaments is small since the total current will be divided among a greater number of filaments. The pluralities having smaller numbers of filaments, presuming that the filaments throughout are of the same cross-sectional area, will have a higher temperature rise. This graded temperature rise effect is desired to produce a greater temperature in those portions of the de-icing shoe where the greatest amount of cold air may impinge upon the blade, thus improving its de-icing efficiency.

Shoes of the type thus far described have been used with considerable success in the de-icing of propeller blades. They are subject, however, to a grave disadvantage in that any cut or abrasion in the de-icing shoe will sever one or more of the filaments 40 thus rendering the entire filament length useless and increasing the electrical load on the remaining filaments which have not been broken. Furthermore, such a fracture even though covering only a small area, will cause the heater to become ineffective over a relatively large area.

This invention proposes to enable much longer effective use of a de-icing shoe by compensating for the breakage of one or more filaments 40, so that only a small increment of area of the shoe is rendered useless should a filament breakage occur. To this end, a plurality of cross connecting wires or connectors such as 60 are laid across the filament pluralities at a number of points between the terminal braids. These connectors are substantially co-extensive with the width of each plurality to which they are attached and are connected at their junction with the filaments by any appropriate means. The electrical connections between the connectors and the filaments may be effected by soldering, spot welding, or by interposing a layer of conductive rubber or cement between the connector and filaments, in order that there will be a fairly good electrical contact at each crossing.

The effect of these connectors will be as follows: When the shoe is electrically energized, and when the shoe is pristine, a connector 60 will have no effect upon the operation of the shoe. If one or more filaments 40, however, should become broken for any reason, as by solid material fracturing the wires either with or without perforation of the outer shoe layer 34, the electrical current which would normally have passed through those filaments will be diverted by the connectors 60 to the remaining strands of filament which are unbroken. If the current flow is assumed to be from left to right in Fig. 3 and some of the filaments 40 were broken in the zone 62, the remaining filaments in the grid increment 64 will carry the entire current and as the succeeding cross connector 60 is reached, the current will be redistributed to the entire number of whole filaments 40 extending onwardly in a rightward direction. The remaining filaments in the zone 64 will be slightly elevated in temperature due to the increased current in the individual filaments, but this temperature increase will be purely local in character and it will not affect the bulk of the resistance grid. Only that area represented by the width of the broken filaments and the length of one zone 64 will be rendered ineffective as a heater.

Should there be a plurality of fractures of filaments 40 along the shoe, even though each filament in a plurality such as 38 may be broken, the effectiveness of the shoe will not be materially reduced since the connectors 60 will redistribute the current in successive zones such as 64 to allow heating of a very substantial portion of the surface area covered by the resistance grid.

Connectors 60 as shown are applied to each plurality of resistance filaments such as 46, 50 and 54 whereby the life expectancy of the grid, with respect to filament breakage liability, is vastly increased.

As has been indicated above, filament breakage may occur even though the rubber protective layer 34 is not punctured. Even if the rubber layer 34 is punctured, it may be repaired by the application of appropriate rubber cement, and outer sheet maintenance can be carried way beyond the point when the ordinary de-icing shoe would have become useless as a heater. The effectiveness of the invention may be appreciated by the fact that the mortality of rubber de-icing shoes is primarily due to filament breakage due to abrasion of the shoe by solid matter, no rubber shoe having yet been developed which will withstand the same degree of abrasion as the material of the propeller blade itself.

In Fig. 4, an alternative grid arrangement is shown wherein the electric lead 22 connects to a bus braid 70 extending longitudinally along one edge of the shoe assembly, this connecting in turn with the braid 72 from which a large plurality of filaments 40 extend toward the inner end of the shoe to a braid 74 connected to the lead 24. The filaments 40 in this resistance grid may be of uniform size if the entire area is to be uniformly heated or alternatively, the filament size in certain portions of the grid, as in the center, may be increased to secure a higher temperature rise than the balance of the grid. Where graded filament sizes are used the same general effect will be secured as shown by the embodiment of Fig. 2. The cross connectors 60 are applied in the grid of Fig. 4 and serve exactly the same function as previously described, to enable effective operation of the grid as a heater even though some of the filaments may be broken.

Fig. 5 shows still another arrangement wherein two pluralities of heater filaments 78 and 80 are connected in series by a braid 82, the other ends of the pluralities being connected through braids 84 and 86 to the leads 22 and 24. In this arrangement the filaments 40 may be of uniform or graded size to secure uniform or graded heat distribution patterns, the pluralities 78 and 80, in the same fashion as has been previously described, being provided with cross connectors 60 to allow continued operation of the heater system despite breakages of one or more of the filaments 40.

An alternative arrangement of the invention not specifically shown in the drawings but of the same general form as the embodiments previously described, comprises cross connectors such as 60 formed of conductive rubber instead of metallic wire. A further alternative embodiment of the invention, not shown as such, comprises pluralities of heater filaments laid upon and bonded to a thin sheet of conductive rubber having high specific resistance. The predominant heating current is carried by the filaments but should one or more filaments be broken, the high resistance path afforded by the conductive layer would enable passage of heating current through virtually the entire filament system despite local breaks in individual filaments.

In all of the various types of flexible shoes above described, the usual practice of feathering the shoe edges as at 90 may be practiced to avoid abrupt transition from the thicker shoe portions to the surface of the propeller blade or other structure to which the shoe is applied.

It will be clear to those familiar with the art that types of wire resistance grid systems other than those shown may be benefited by the teachings of this invention. For instance, grid systems have been proposed wherein a pair of spaced longitudinal conductor braids extend along each side of the shoe, said conductors being joined by a large plurality of short resistance filaments between them. In such an arrangement, the connectors such as 60 may run longitudinally of the shoe rather than crosswise as shown in the illustrated embodiments.

One of the requirements in constructing de-icing shoes is to retain great flexibility therein so that they may readily be conformed to different airfoil shapes and curves. The cross connectors such as 60 may be incorporated in de-icing shoes without appreciably effecting this flexibility.

Though several embodiments illustrating the invention have been shown and described, it is to be understood that the invention may be applied in other and various forms. Changes may be made in the arrangements, without departing from the spirit of the invention. Reference should be had to the appended claim for definitions of the limits of the invention.

What is claimed is:

In an electrical de-icing shoe for the leading edge of a propeller blade comprising a flexible insulating sheet adapted to be secured to the blade, bus conductors in insulated relation imbedded in said sheet, and a plurality of resistance filaments in insulated relation to one another connected in parallel to said bus conductors, a plurality of flexible conductor elements insulated from one another and spaced apart between said bus conductors, each said element being connected to each said filament, said filaments and elements being imbedded, like said bus conductors, in said sheet, and being spaced from one another a distance materially greater than the spacing between said filaments, the connections between said filaments and elements comprising fused metal.

GODFREY B. SPEIR.
DEL WEHRLE.

REFERENCES CITED

The following references are of record in the file of this patent:

UNITED STATES PATENTS

| Number | Name | Date |
| --- | --- | --- |
| 919,402 | Trumpler | Apr. 27, 1909 |
| 1,771,273 | Smith | July 22, 1930 |
| 2,165,970 | Jaspers | July 11, 1939 |
| 2,205,543 | Rideau et al. | June 25, 1940 |
| 2,406,367 | Griffith et al. | Aug. 27, 1946 |